(12) United States Patent
Van Phan et al.

(10) Patent No.: US 10,492,166 B2
(45) Date of Patent: Nov. 26, 2019

(54) REPORTING OF LOCATION INFORMATION

(71) Applicant: NOKIA TECHNOLOGIES OY, Espoo (FI)

(72) Inventors: Vinh Van Phan, Oulu (FI); Ling Yu, Kauniainen (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/300,512

(22) PCT Filed: May 12, 2016

(86) PCT No.: PCT/FI2016/050313
§ 371 (c)(1),
(2) Date: Nov. 9, 2018

(87) PCT Pub. No.: WO2017/194821
PCT Pub. Date: Nov. 16, 2017

(65) Prior Publication Data
US 2019/0166575 A1    May 30, 2019

(51) Int. Cl.
H04W 64/00    (2009.01)
G01S 5/00    (2006.01)
G01S 1/00    (2006.01)
H04W 4/44    (2018.01)
H04W 4/40    (2018.01)

(52) U.S. Cl.
CPC .............. *H04W 64/003* (2013.01); *G01S 1/00* (2013.01); *G01S 5/0027* (2013.01); *H04W 4/40* (2018.02); *H04W 4/44* (2018.02); *H04W 64/00* (2013.01)

(58) Field of Classification Search
CPC ....... H04W 64/003; H04W 4/40; H04W 4/44; H04W 64/00; G01S 5/0027; G01S 1/00
See application file for complete search history.

(56) References Cited

U.S. PATENT DOCUMENTS

| 2006/0293066 A1* | 12/2006 | Edge ................... H04W 64/00 455/456.3 |
| 2010/0080163 A1 | 4/2010 | Krishnamoorthi et al. |
| 2013/0294321 A1 | 11/2013 | Want et al. |
| 2014/0171097 A1 | 6/2014 | Fischer et al. |
| 2015/0208225 A1* | 7/2015 | Yu ....................... H04W 76/14 370/329 |
| 2015/0281940 A1* | 10/2015 | Yu ....................... H04W 60/00 455/456.1 |

FOREIGN PATENT DOCUMENTS

| EP | 1 617 603 A1 | 1/2006 |
| WO | 2005/015934 A1 | 2/2005 |

OTHER PUBLICATIONS

International Search Report and Written Opinion corresponding to International Application No. PCT/FI2016/050313, dated Aug. 30, 2016.

* cited by examiner

*Primary Examiner* — Joseph E Dean, Jr.
(74) *Attorney, Agent, or Firm* — Squire Patton Boggs (US) LLP

(57) ABSTRACT

This specification describes a method comprising, in response to detecting a reference radio access network entity within a vicinity of a user equipment, adapting a mode of reporting of location information identifying or enabling identification of a location of the user equipment.

15 Claims, 8 Drawing Sheets

REPORTING OF LOCATION INFORMATION

FIELD

This specification relates generally to the reporting of location information by user equipment in a radio access network.

BACKGROUND

One of the aims with future E-UTRA (Advanced LTE) networks is to support Vehicle-to-X (V2X) communication. V2X communication is the passing of information from a vehicle to any entity that may affect the vehicle, and vice versa. This information exchange can be used for a host of safety, mobility and environmental applications to include driver assistance and vehicle safety, speed adaptation and warning, emergency response, safety, traveler information, navigation, traffic operations and demand management, personal navigation, commercial fleet planning and payment transactions. There may be significant societal benefit and commercial value to delivering safety, mobility and convenience applications that rely on V2X.

Basic entities within a V2X communication system are the vehicle (V) and its connectivity to any other Intelligent Transportation System (ITS) station. Therefore, V2X communication systems include transceivers, in the form of eNodeBs (eNBs) or user equipment (UEs) located on vehicles, mounted on the roadside infrastructure, in aftermarket devices, or within handheld devices. V2X communication may include, but not exclusively, Vehicle to Vehicle (V2V) communication and Vehicle to Infrastructure (V2I) communication.

Recent documents published by the 3GPP include provisions for the implementation of V2X. However, much of the implementation detail is still marked as "for future study".

SUMMARY

In a first aspect, this specification describes a method comprising in response to detecting a reference radio access network entity within a vicinity of a user equipment, adapting a mode of reporting of location information identifying or enabling identification of a location of the user equipment. Adapting the mode of reporting of location information identifying or enabling identification of the location of the user equipment may include suspending reporting of explicit geo-location information.

The method may comprise detecting the reference radio access network entity within the vicinity based on receipt of a message from the reference radio access network entity. The method may comprise adapting the mode of the reporting of location information based on assistance information in the message which indicates that a location of the reference radio access network entity is known to an eNodeB or an associated server apparatus. The assistance information may include an identifier associated with the reference radio access network entity.

Adapting the mode of the reporting of location information may include suspending reporting of geo-location information and causing transmission of a message including implied location information (e.g. an identifier associated with the reference radio access network entity).

The method may comprise, prior to detecting the reference radio access network entity, receiving from an eNodeB information including an identifier associated with the reference radio access network entity.

In some examples, the method may comprise adapting the mode of the reporting of location information based on assistance information in the message which indicates a capability of the reference radio access network entity to report location information on behalf of the user equipment. Adapting the mode of the reporting of location information may include suspending the reporting of all location information during timeslots allocated for reporting location information.

The method may comprise, prior to detecting the reference radio access network entity, receiving from an eNodeB configuration information indicating that the mode of reporting of location information should be adapted in response to detecting the reference network entity in the vicinity. The configuration information may indicate at least two modes of reporting of location information, at least one of the modes being associated with the detection of the reference radio access network entity in the vicinity of the user equipment. The configuration information may include location reporting mode priority information indicating relative priorities of at least two modes of reporting of location information.

The method may comprise, in response to determining that the reference radio access network entity is no longer within the vicinity of the user equipment, causing resumption of an original mode of reporting of location information identifying the location of the user equipment.

The method may comprise determining if the reference radio access network entity is in the vicinity of the user equipment, in response to detecting the reference radio access network entity within the vicinity of the user equipment, adapting the mode of reporting of location information by suspending reporting of geo-location information identifying a location of the user equipment, and in response to determining that the reference radio access network entity is not within the vicinity of the user equipment, causing performance of the reporting of geo-location information identifying the location of the user equipment.

In a second aspect, this specification describes a method comprising responding to a determination that a scheduled uplink transmission interval for a user equipment falls within an acceptable offset from an interval allocated to the user equipment for reporting of location information by causing the reporting of the location information to be performed in the same interval as transmission of data scheduled for transmission during the scheduled uplink transmission interval. Reporting of the location information and the transmission of the scheduled data may be performed in the scheduled uplink transmission interval.

In a third aspect, this specification describes a method comprising receiving, at an eNodeB, information from a user equipment identifying a reference radio access network access entity in the vicinity of the user equipment or information from the reference radio access network entity identifying the user equipment, and determining, at the eNodeB, a location of the user equipment based on the received information and information identifying a location of the reference radio access network entity or forwarding, by the eNodeB, the received information to enable determination of the location of the user equipment based on the forwarded information and information identifying the location of the reference radio access network entity.

The method may comprise configuring the reference radio access network entity by providing configuration information to the reference radio access network entity for causing the reference radio access network entity to advertise to user equipment in the vicinity of the reference radio access network entity a capability of the reference radio access network entity to report on behalf of the user equipment information for enabling determination of the location of user equipment.

The method may comprise configuring the reference radio access network entity by providing configuration information to the reference radio access network entity for causing the reference radio access network entity to advertise to user equipment in the vicinity of the reference radio access network entity that the location of the reference radio access network entity is known.

The method may comprise selecting the reference radio access network entity on the basis of information received from vehicle-to-X communications server apparatus and providing the configuration information to the reference radio access network entity in response to the selecting.

The method may comprise causing transmission to user equipment being served by the eNodeB of configuration information for causing the user equipment to adapt a mode of reporting of geo-location information identifying a location of the user equipment in response to detecting the reference radio access network entity in the vicinity of the user equipment.

The configuration information may include the identifier associated with the reference radio access network entity.

The configuration information may identify at least two location information reporting modes for the user equipment, at least one reporting mode being associated with detection of a reference radio access network entity by the user equipment.

The configuration information may include location reporting mode priority information indicating relative priorities of at least two location information reporting modes for the user equipment.

The at least two location information reporting modes for the user equipment may include transmitting to the eNodeB geo-location information identifying a location of the user equipment and at least one of: transmitting to the eNodeB an identifier associated with the reference radio access network entity detected in the vicinity of the user equipment; and responding to determination that the reference radio access network entity detected in the vicinity of the user equipment is capable to report on behalf of the user equipment information for enabling determination of the location of user equipment by suspending all transmissions during intervals allocated to the user equipment for reporting of geo-location information.

In a fourth aspect, this specification describes a method comprising announcing by a reference radio access network entity to one or more user equipments within a vicinity of the reference radio access network entity location reporting assistance information, wherein the location reporting assistance information includes one of: an indication that the reference radio access network entity is operable to report information for enabling determination of the location of user equipment on behalf of the user equipment; and an indication that a location of the reference radio access network entity is known to an eNodeB or an associated server apparatus.

The location reporting assistance information including the indication that the location of the reference radio access network entity is known may include an identifier associated with the reference radio access network entity. The identifier associated with the reference radio access network entity may have been provided to the radio access network by an eNodeB.

The identifier may indicates to the user equipment that the location of the radio access network entity is known to the eNodeB or the associated server apparatus.

The location reporting assistance information including the indication that the location of the reference radio access network entity is known may include one or more identifiers of one or more eNodeBs by which the location of the reference radio access network entity is known.

The location reporting assistance information may include the indication that the reference radio access network entity is operable to report information for enabling determination of the location of user equipment on behalf of the user equipment, and the method may further comprise in response to detecting the user equipment in the vicinity of the reference radio access network entity, the reference radio access network entity reporting to the eNodeB that the user equipment is in the vicinity of the reference radio access network entity. The method may comprise the reference radio access network entity reporting to the eNodeB that the user equipment is in the vicinity of the reference radio access network entity in response to receiving permission from the user equipment to do so.

In a fifth aspect, this specification describes a method comprising receiving by a user equipment location reporting configuration information, wherein the location reporting configuration information identifies at least two location information reporting modes for the user equipment, at least one reporting mode being associated with detection of a reference radio access network entity. The method may further comprise, in response to detecting the reference radio access network entity in the vicinity of the user equipment, the user equipment switching to the reporting mode associated with the detection of a reference radio access network entity. Switching to the reporting mode associated with the detection of the reference radio access network entity may include one of: suspending reporting of all location information or suspending reporting of explicit location information and instead causing transmission of information identifying the reference radio access network.

In a sixth aspect, this specification describes a method comprising causing transmission of location reporting configuration information to a user equipment, wherein the location reporting configuration information identifies at least two location information reporting modes for the user equipment, at least one reporting mode being associated with detection of a reference radio access network entity by the user equipment. The method may further comprise receiving from the user equipment location information identifying the reference radio access network entity or receiving from the reference radio access network entity location information identifying the user equipment. In some examples, the method may further comprise determining a location of the user equipment based on location information received from the user equipment or from the reference radio access entity and known location information of reference radio access network entity.

In a seventh aspect, this specification describes apparatus configured to perform a method according to any of the first to sixth aspects.

In an eighth aspect, this specification describes computer-readable instructions which, when executed by computing apparatus, cause performance of a method according to any of the first to sixth aspects.

In a ninth aspect, this specification describes apparatus comprising at least one processor, and at least one memory including computer program code which, when executed by the at least one processor, causes the apparatus, in response to detecting a reference radio access network entity within a vicinity of a user equipment, to adapt a mode of reporting of location information identifying or enabling identification of a location of the user equipment.

The computer program code, when executed by the at least one processor, may cause the apparatus to detect the reference radio access network entity within the vicinity based on receipt of a message from the reference radio access network entity. The computer program code, when executed by the at least one processor, may cause the apparatus to adapt the mode of the reporting of location information based on assistance information in the message which indicates that a location of the reference radio access network entity is known to an eNodeB or an associated server apparatus.

The assistance information may include an identifier associated with the reference radio access network entity.

Adapting the mode of the reporting of location information may include suspending reporting of geo-location information and causing transmission of a message including an identifier associated with the reference radio access network entity.

The computer program code, when executed by the at least one processor, may cause the apparatus to, prior to detecting the reference radio access network entity, receive from an eNodeB information including an identifier associated with the reference radio access network entity.

In some examples, the computer program code, when executed by the at least one processor, may cause the apparatus to adapt the mode of the reporting of location information based on assistance information in the message which indicates a capability of the reference radio access network entity to report location information on behalf of the user equipment. Adapting the mode of the reporting of location information may include suspending the reporting of location information during timeslots allocated for reporting location information.

The computer program code, when executed by the at least one processor, may cause the apparatus to, prior to detecting the reference radio access network entity, receive from an eNodeB configuration information indicating that the mode of reporting of location information should be adapted in response to detecting the reference network entity in the vicinity. The configuration information may indicate at least two modes of reporting of location information, at least one of the modes being associated with the detection of the reference radio access network entity in the vicinity of the user equipment. The configuration information may include location reporting mode priority information indicating relative priorities of at least two modes of reporting of location information.

The computer program code, when executed by the at least one processor, may cause the apparatus to, in response to determining that the reference radio access network entity is no longer within the vicinity of the user equipment, to cause resumption of an original mode of reporting of location information identifying the location of the user equipment.

The computer program code, when executed by the at least one processor, may cause the apparatus to determine if the reference radio access network entity is in the vicinity of the user equipment, in response to detecting the reference radio access network entity within the vicinity of the user equipment, to adapt the mode of reporting of location information by suspending reporting of geo-location information identifying a location of the user equipment, and in response to determining that the reference radio access network entity is not within the vicinity of the user equipment, to cause performance of the reporting of geo-location information identifying the location of the user equipment.

In a tenth aspect, this specification describes apparatus comprising at least one processor, and at least one memory including computer program code which, when executed by the at least one processor, causes the apparatus to respond to a determination that a scheduled uplink transmission interval for a user equipment falls within an acceptable offset from an interval allocated to the user equipment for reporting of location information by causing the reporting of the location information to be performed in the same interval as transmission of data scheduled for transmission during the scheduled uplink transmission interval. Reporting of the location information and the transmission of the scheduled data may be performed in the scheduled uplink transmission interval.

In an eleventh aspect, this specification describes apparatus comprising at least one processor, and at least one memory including computer program code which, when executed by the at least one processor, causes the apparatus: to receive, at an eNodeB, information from a user equipment identifying a reference radio access network access entity in the vicinity of the user equipment or information from the reference radio access network entity identifying the user equipment; and to determine, at the eNodeB, a location of the user equipment based on the received information and information identifying a location of the reference radio access network entity or to forward, by the eNodeB, the received information to enable determination of the location of the user equipment based on the forwarded information and information identifying the location of the reference radio access network entity.

The computer program code, when executed by the at least one processor, may cause the apparatus to configure the reference radio access network entity by providing configuration information to the reference radio access network entity for causing the reference radio access network entity to advertise to user equipment in the vicinity of the reference radio access network entity a capability of the reference radio access network entity to report on behalf of the user equipment information for enabling determination of the location of user equipment.

The computer program code, when executed by the at least one processor, may cause the apparatus to configure the reference radio access network entity by providing configuration information to the reference radio access network entity for causing the reference radio access network entity to advertise to user equipment in the vicinity of the reference radio access network entity that the location of the reference radio access network entity is known.

The computer program code, when executed by the at least one processor, may cause the apparatus to select the reference radio access network entity on the basis of information received from vehicle-to-X communications server apparatus and providing the configuration information to the reference radio access network entity in response to the selecting.

The computer program code, when executed by the at least one processor, may cause the apparatus to cause transmission to user equipment being served by the eNodeB of configuration information for causing the user equipment to adapt a mode of reporting of geo-location information identifying a location of the user equipment in response to detecting the reference radio access network entity in the vicinity of the user equipment.

The configuration information may include the identifier associated with the reference radio access network entity.

The configuration information may identify at least two location information reporting modes for the user equipment, at least one reporting mode being associated with detection of a reference radio access network entity by the user equipment.

The configuration information may include location reporting mode priority information indicating relative priorities of at least two location information reporting modes for the user equipment.

The at least two location information reporting modes for the user equipment may include transmitting to the eNodeB geo-location information identifying a location of the user equipment and at least one of: transmitting to the eNodeB an identifier associated with the reference radio access network entity detected in the vicinity of the user equipment; and responding to determination that the reference radio access network entity detected in the vicinity of the user equipment is capable to report on behalf of the user equipment information for enabling determination of the location of user equipment by suspending all transmissions during intervals allocated to the user equipment for reporting of geo-location information.

In a twelfth aspect, this specification describes apparatus comprising at least one processor, and at least one memory including computer program code which, when executed by the at least one processor, causes the apparatus to announce to one or more user equipments within a vicinity location reporting assistance information, wherein the location reporting assistance information includes one of: an indication that the reference radio access network entity is operable to report information for enabling determination of the location of user equipment on behalf of the user equipment; and an indication that a location of the reference radio access network entity is known to an eNodeB or an associated server apparatus.

The location reporting assistance information including the indication that the location of the reference radio access network entity is known may include an identifier associated with the reference radio access network entity. The identifier associated with the reference radio access network entity may have been provided to the radio access network by an eNodeB.

The identifier may indicate to the user equipment that the location of the radio access network entity is known to the eNodeB or the associated server apparatus.

The location reporting assistance information including the indication that the location of the reference radio access network entity is known may include one or more identifiers of one or more eNodeBs by which the location of the reference radio access network entity is known.

The location reporting assistance information may include the indication that the reference radio access network entity is operable to report information for enabling determination of the location of user equipment on behalf of the user equipment, and the computer program code, when executed by the at least one processor, may cause the apparatus, in response to detecting the user equipment in the vicinity of the reference radio access network entity, to report to the eNodeB that the user equipment is in the vicinity of the reference radio access network entity. The computer program code, when executed by the at least one processor, may cause the apparatus to report to the eNodeB that the user equipment is in the vicinity of the reference radio access network entity in response to receiving permission from the user equipment to do so.

In a thirteenth aspect, this specification describes apparatus comprising at least one processor, and at least one memory including computer program code which, when executed by the at least one processor, causes the apparatus: to receive, at a user equipment, location reporting configuration information, wherein the location reporting configuration information identifies at least two location information reporting modes for user equipment, at least one reporting mode being associated with detection of a reference radio access network entity.

In a fourteenth aspect, this specification describes apparatus comprising at least one processor, and at least one memory including computer program code which, when executed by the at least one processor, causes the apparatus: to cause transmission of location reporting configuration information to a user equipment, wherein the location reporting configuration information identifies at least two location information reporting modes for the user equipment, at least one reporting mode being associated with detection of a reference radio access network entity by the user equipment.

In a fifteenth aspect, this specification describes a computer-readable medium having computer-readable code stored thereon, the computer readable code, when executed by a least one processor, causing performance of at least: in response to detecting a reference radio access network entity within a vicinity of a user equipment, adapting a mode of reporting of location information identifying or enabling identification of a location of the user equipment. The computer-readable code stored on the medium of the fifteenth aspect may further cause performance of any of the operations described with reference to the method of the first aspect.

In a sixteenth aspect, this specification describes computer-readable medium having computer-readable code stored thereon, the computer readable code, when executed by a least one processor, causing performance of at least: responding to a determination that a scheduled uplink transmission interval for a user equipment falls within an acceptable offset from an interval allocated to the user equipment for reporting of location information by causing the reporting of the location information to be performed in the same interval as transmission of data scheduled for transmission during the scheduled uplink transmission interval. The computer-readable code stored on the medium of the sixteenth aspect may further cause performance of any of the operations described with reference to the method of the second aspect.

In a seventeenth aspect, this specification describes computer-readable medium having computer-readable code stored thereon, the computer readable code, when executed by a least one processor, causing performance of at least: receiving, at an eNodeB, information from a user equipment identifying a reference radio access network access entity in the vicinity of the user equipment or information from the reference radio access network entity identifying the user equipment; and determining, at the eNodeB, a location of the user equipment based on the received information and information identifying a location of the reference radio access network entity or forwarding, by the eNodeB, the received information to enable determination of the location of the user equipment based on the forwarded information and information identifying the location of the reference radio access network entity. The computer-readable code stored on the medium of the seventeenth aspect may further cause performance of any of the operations described with reference to the method of the third aspect.

In an eighteenth aspect, this specification describes computer-readable medium having computer-readable code stored thereon, the computer readable code, when executed by a least one processor, causing performance of at least announcing to one or more user equipments within a vicinity location reporting assistance information, wherein the location reporting assistance information includes one of: an indication that the reference radio access network entity is operable to report information for enabling determination of the location of user equipment on behalf of the user equipment; and an indication that a location of the reference radio access network entity is known to an eNodeB or an associated server apparatus. The computer-readable code stored on the medium of the eighteenth aspect may further cause performance of any of the operations described with reference to the method of the fourth aspect.

In a nineteenth aspect, this specification describes computer-readable medium having computer-readable code stored thereon, the computer readable code, when executed by a least one processor, causing performance of at least receiving, at a user equipment, location reporting configuration information, wherein the location reporting configuration information identifies at least two location information reporting modes for user equipment, at least one reporting mode being associated with detection of a reference radio access network entity.

In a twentieth aspect, this specification describes computer-readable medium having computer-readable code stored thereon, the computer readable code, when executed by a least one processor, causing performance of at least: causing transmission of location reporting configuration information to a user equipment, wherein the location reporting configuration information identifies at least two location information reporting modes for the user equipment, at least one reporting mode being associated with detection of a reference radio access network entity by the user equipment.

In a twenty-first aspect, this specification describes apparatus comprising means for, in response to detecting a reference radio access network entity within a vicinity of a user equipment, adapting a mode of reporting of location information identifying or enabling identification of a location of the user equipment. The apparatus of the twenty-first aspect may further comprise means for causing performance of any of the operations described with reference to the method of the first aspect.

In a twenty-second aspect, this specification describes apparatus comprising means for responding to a determination that a scheduled uplink transmission interval for a user equipment falls within an acceptable offset from an interval allocated to the user equipment for reporting of location information by causing the reporting of the location information to be performed in the same interval as transmission of data scheduled for transmission during the scheduled uplink transmission interval. The apparatus of the twenty-second aspect may further comprise means for causing performance of any of the operations described with reference to the method of the second aspect.

In a twenty-third aspect, this specification describes apparatus comprising means for receiving, at an eNodeB, information from a user equipment identifying a reference radio access network access entity in the vicinity of the user equipment or information from the reference radio access network entity identifying the user equipment; and means for determining, at the eNodeB, a location of the user equipment based on the received information and information identifying a location of the reference radio access network entity or means for forwarding, by the eNodeB, the received information to enable determination of the location of the user equipment based on the forwarded information and information identifying the location of the reference radio access network entity. The apparatus of the twenty-third aspect may further comprise means for causing performance of any of the operations described with reference to the method of the third aspect.

In a twenty-fourth aspect, this specification describes apparatus comprising means for announcing to one or more user equipments within a vicinity location reporting assistance information, wherein the location reporting assistance information includes one of: an indication that the reference radio access network entity is operable to report information for enabling determination of the location of user equipment on behalf of the user equipment; and an indication that a location of the reference radio access network entity is known to an eNodeB or an associated server apparatus. The apparatus of the twenty-fourth aspect may further comprise means for causing performance of any of the operations described with reference to the method of the fourth aspect.

In a twenty-fifth aspect, this specification describes apparatus comprising means for receiving, at a user equipment, location reporting configuration information, wherein the location reporting configuration information identifies at least two location information reporting modes for user equipment, at least one reporting mode being associated with detection of a reference radio access network entity.

In a twenty-sixth aspect, this specification describes apparatus comprising means for causing transmission of location reporting configuration information to a user equipment, wherein the location reporting configuration information identifies at least two location information reporting modes for the user equipment, at least one reporting mode being associated with detection of a reference radio access network entity by the user equipment.

BRIEF DESCRIPTION OF THE FIGURES

For better understanding of the present application, reference will now be made by way of example to the accompanying drawings in which.

DETAILED DESCRIPTION

Figure 1:
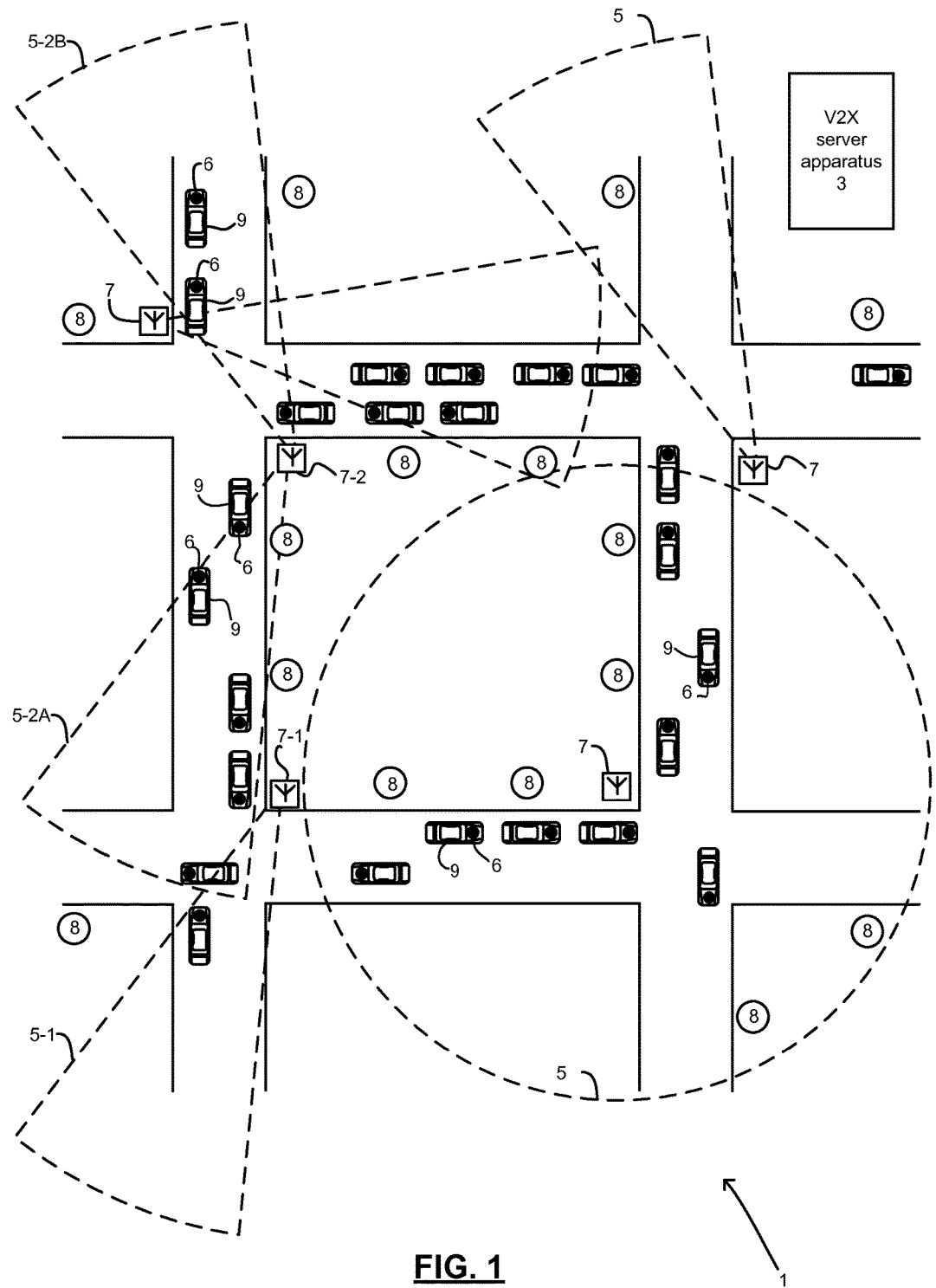
FIG. 1 is an example of a mobile telecommunications radio access network including one or more eNodeBs (eNBs), one or more user equipments (UEs) and one or more radio access network (RAN) entity.

In the description and drawings, like reference numerals refer to like elements throughout.

Various methods and apparatuses are described in detail below, by way of example only, in the context of a mobile telecommunications radio access network 1, such as that illustrated in FIG. 1. The network 1 comprises one or more base stations or access points (eNodeBs, eNBs) 7. Only a small number of eNBs 7 are shown in FIG. 1, but a radio access network may typically comprise thousands of eNBs 7. Together, the eNBs 7 may provide radio coverage to one or more user equipment (UE) 6 over a wide geographical area. The network may also comprise one or more RAN reference entities 8 although, as will be discussed below, in some examples, some or all RAN reference entities 8 may in fact be UEs 6.

Each eNB 7 operates one or more cells 5, which are denoted in FIG. 1, for illustrative purposes only, by the dashed circles or sectors thereof. Although the coverage areas of the cells are shown illustratively in FIG. 1 as circles or sectors thereof, in reality, the coverage area of each cell depends on the transmission power and the directionality of the antenna (or antennas) by which the cell is operated. The coverage area of each cell 5 may also depend on obstacles (such as buildings) which are in the vicinity of the eNB 7, carrier frequency and channel propagation characteristics etc.

The configuration of the coverage area of the cells 5 may be selected so as to serve UEs 6 in a particular area while not providing coverage to other areas. For instance, the configuration of a coverage area of a cell may be selected so as to provide coverage for an area in which users are commonly present while not providing coverage for areas in which users are seldom present. For instance, in FIG. 1, a first cell 5-1 operated by a first eNB 7-1 is depicted as only a sector of a circle. Indeed, in some examples (as illustrated in FIG. 1), an eNB 7 may be configured to provide coverage (via a cell) up and/or down a road but not either side of the road.

A single eNB 7 may, in some examples, provide two or more cells 5. For instance, a first cell 5 may be provided in a first direction from the eNB 7 while a second cell 5 may be provided in a different direction. In FIG. 1, this is illustrated by a second eNB 7-2 which is shown as operating two different cells 5-2A and 5-2B.

One or more of the UEs 6 may be configured for bi-directional communication with one or more of the eNBs 7. In such examples, the transmission of data from the eNB 7 to the UE 6 may be referred to as "downlink". Transmission of data from the UE 6 to the eNB 7 may be referred to as "uplink". The eNBs 7, or some other entity within the network 1, may be operable to schedule uplink timeslots (transmission time intervals) for the UEs 6 within the cell 6 operated by the eNBs 7. Scheduling information including the scheduled time slot and a number of physical resource blocks (PRBs), or simply resource blocks, allocated for the UE 6 is then communicated to the UE 6, for instance by the eNB 7 operating the cell. The scheduling information may be transmitted as a message which may be referred to as an uplink scheduling grant.

Figure 6:
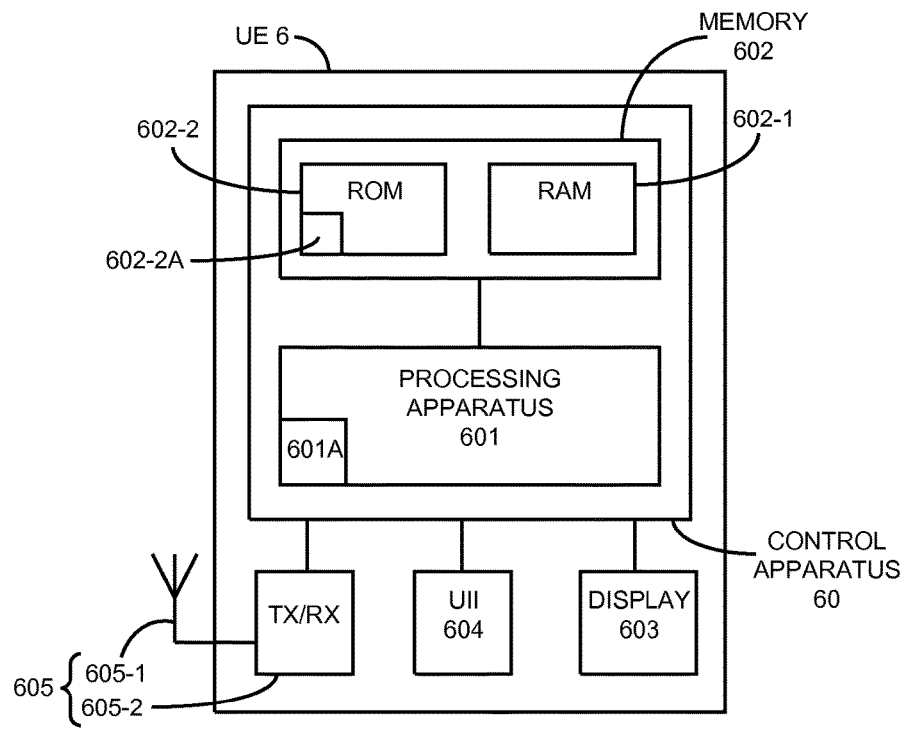
FIG. 6 is a schematic illustration of an example configuration of a UE which may be configured to perform various operations described with reference to FIGS. 1, 2, 4 and 5.

As can be seen in FIG. 6, the UE 6 comprises control apparatus 60 which is configured to control operation of other components forming part of the UE 6 thereby to enable transmission of data, via uplink, to the eNBs 7 as well as receipt of data from the eNBs 7, via downlink. The control apparatus 60 may additionally be configured to cause performance of any other operations described herein with reference to the UEs 6, for instance with reference to FIG. 2. Example configurations of the control apparatus 60 and the UE 6 as a whole are discussed in more detail later in relation to FIG. 6.

Figure 7:
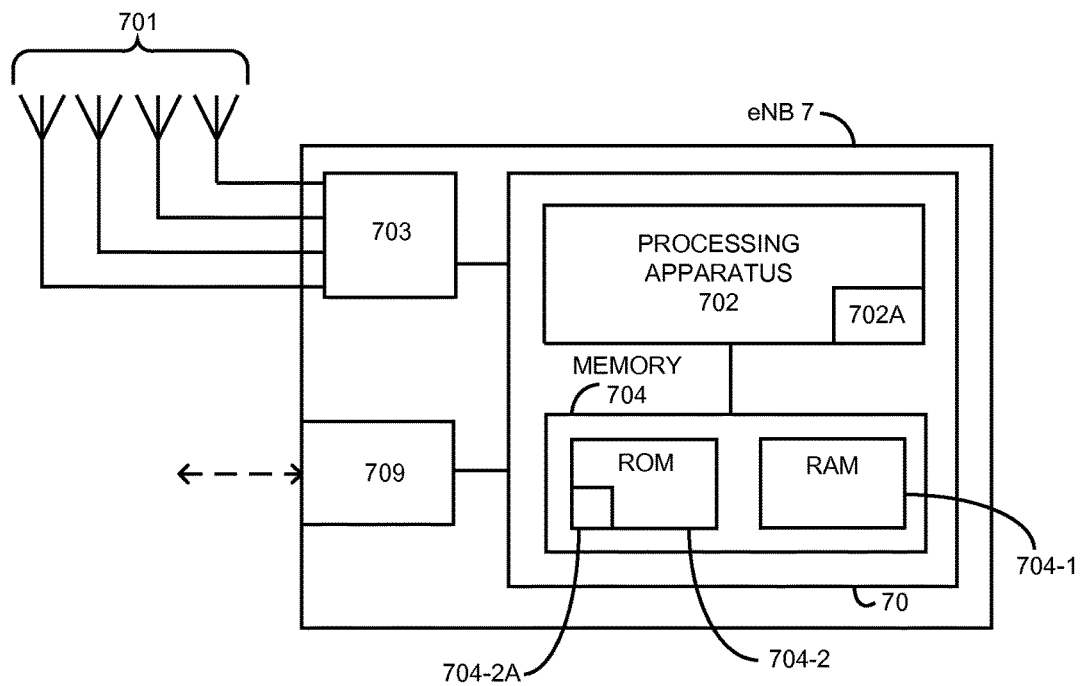
FIG. 7 is a schematic illustration of an example configuration of an eNB which may be configured to perform various operations described with reference to FIGS. 1, 3, 4 and 5.

Similarly, as illustrated in FIG. 7, the eNBs 7 may comprise control apparatus 70 for enabling bi-directional communication with one or more UEs 6, including transmission of location reporting assistance information or configuration information. The control apparatus 70 may additionally be configured to cause performance of any other operations described herein with reference to the eNBs 7, for instance with reference to FIG. 3. Example configurations of the control apparatus 70 and the eNB 7 as a whole are discussed in more detail later in relation to FIG. 7.

The mobile telecommunications radio access network 1 may be, but is not limited to, an Evolved Universal Terrestrial Radio Access (E-UTRA) network, which may sometimes be referred to as LTE Advanced network. The eNBs 7, UEs 6 and RAN reference entities 8 in the network 1 may be configured to communicate with one another using an OFDM-based access scheme, such as orthogonal frequency division multiple access (OFDMA) and/or single carrier frequency division multiple access (SC-FDMA). For instance, in some non-limiting examples OFDMA may be used for downlink communications whereas SC-FDMA may be used for uplink communications.

In the example of FIG. 1, the eNBs 7 are shown as providing coverage to a portion of a transportation system, in this case in the form of a series of roads. In such examples, the UEs 6 may form part of, or be travelling in, vehicles 9, such as cars. As such, the network and entities therein may be said to be configured for V2X communication. UEs which are carried by or integrated in vehicles may be referred to as "vehicle UEs". Messages transmitted by vehicle UEs 6 may include indicators indicating that the sender is a vehicle UE 6. In this way, the eNBs 7 and RAN reference entities 8 may be able to distinguish between vehicle UEs and UEs of, for instance pedestrians, the locations of which may be less important. In some examples, the eNBs and RAN reference entities may be configured to operate as described herein in respect of only vehicle UEs.

In FIG. 1, only a portion of the vehicles 9 and vehicle UEs 6 are indicated using reference numerals. However, it will of course be appreciated that any number of the vehicles travelling in a transportation system may include a vehicle UE 6. As will also be appreciated, FIG. 1 is intended for illustrative purposes only and is not to scale.

The RAN reference entities 8 may be referred to as such because, as will become clear from the following description, they may provide a location of reference for use in determining locations of the UEs in the network. The RAN reference entities 8 may be configured to communicate with the UEs 6 and/or the eNBs 7. The RAN reference entities 8 may be of two different types: an eNB-type entity and a UE-type entity. Put simply, eNB-type RAN reference entities 8 may have the capabilities/functionality normally associated with eNBs whereas the UE-type RAN reference entities 8 may have the capabilities/functionality normally associated with UEs.

The eNBs 7 or associated server apparatus 3 (e.g. a V2X server) may include data/information identifying the RAN reference entities 8 within the vicinity of the eNB 7. The vicinity of the eNB 7 may include the coverage area of the cell or may be larger than the cell coverage area. In addition, the eNBs (or associated server apparatus 3) may include information identifying the geo-locations of the RAN reference entities 8 within its coverage area(s). For eNB-type RAN reference entities 8, the locations of the eNBs may not change regularly. In such cases, the locations of the RAN reference entities 8 may be pre-programmed into the eNBs or associated server apparatus 3 or may be received in some other manner. For UE-type RAN reference entities 8, the eNBs may be regularly informed of the location of the RAN reference entity (for instance by the RAN reference entity 8 itself).

In implementations, such as the example of FIG. 1, in which the network 1 provides coverage to a transportation system, at least some of the other RAN reference entities 8 may be in the form of roadside units (RSUs) which may be positioned on the various infrastructure units (e.g. road signs, traffic lights, street lamps) which are provided at relatively short intervals (e.g. 30 metres) along routes of transportation systems. These RSUs may be of either the UE-type or the eNB-type.

In addition to RSUs, the RAN reference entities 8 may include UEs, the locations of which are known by a particular eNB 7 and/or which regularly transmit their location to an eNB 7 within the network 1. Examples may include, for instance, vehicle UEs of parked cars or UEs of pedestrians. In some implementations, the V2X server 3/eNB 7 may even select (see for instance, operation S3.2 of FIG. 3) one or more vehicle UE 6 to act as a RAN reference entity 8. In such cases, the selected vehicle UE 6/RAN reference entity 8 may be configured to frequently report to the eNBs/V2X server with its location (for instance by operating in explicit geo-location reporting mode) and may also provide location reporting assistance (which is discussed in more detail below) to other vehicle UEs 6 in the vicinity. As will be appreciated from the below discussion, by utilising vehicle UEs 6 as RAN reference entities 8, it may be possible to obtain at least some of the benefits of the methods and systems described herein without requiring infrastructural units to be installed throughout the transportation system.

The UEs 6 may be operable to provide geo-location information (for instance, derived using a global navigation satellite system (GNSS) such as GPS or GLONASS) to the eNBs 7. In this context, geo-location information may include information which explicitly identifies the location of the entity to which it relates. For instance, geo-location information may include, but is certainly not limited to, geographic coordinates. The geo-location information of the UEs may be processed and used by, for instance, the server apparatus 3. In a V2X context, the geo-location information may be used to control operation of infrastructure entities such as traffic lights, road signs etc. Similarly, the server apparatus 3 may cause warning or control information to be transmitted back to the UEs based on the geo-location information transmitted by the UE 6.

The UEs 6 may be allocated regular timeslots in which to transmit their location information to the eNB 7 which is currently serving the UE 6. The regular timeslots allocated for location information may be additional to the previously discussed scheduled uplink transmissions.

In addition to the geo-location information (the information explicitly identifying an entity's location), movement information may be transmitted in the timeslots allocated for reporting of location information. Movement information may relate to movement of the entity and may include, but is not limited to velocity and/or direction/heading of the UE.

The eNBs 7 may be configured to forward the received geo-location information (along with movement, information if applicable) to the V2X server 3 (or some other similar server apparatus) for processing and use. Alternatively, for instance but not exclusively when the eNB 7 forms part of an infrastructural entity, the eNB/infrastructural entity may process and use the geo-location information instead of, or in addition to, forwarding it. For example, the eNBs 7 may be configured to perform various operations on the basis of the received geo-location information. Such operations may include, for example but not exclusively, location-based resource allocation on direct link between UEs (e.g. sidelink or PC5 interface specified in current LTE standardisation documents for proximity services/device-to-device (D2D), which supports V2V).

There can be a very large number of vehicles on a transportation system at any one time (this is particularly true of cars in cities and on motorways). As such, the interference and radio traffic resulting from the transmission of geo-location information by some or all of the vehicles has the potential to be problematic for the network, particularly with regard to achieving the ultra-reliable low-latency communications (URLLC) towards which E-UTRA networks are aiming.

In order to reduce the amount of data traffic in the network 1, the control apparatus 60 of the UE 6 may be configured to adapt a mode of reporting of location information for identifying the location of the UE 6 in response to detecting a RAN reference entity 8 within a vicinity of a UE 6. The UE 6 may have been configured or controlled to respond in this way by an eNB (for instance, the eNB by which it is currently being served). In particular, the UE 6 may receive from an eNB configuration information indicating how the UE 6 should behave in response to detecting the RAN reference entity in its vicinity. The configuration information may identify at least two modes of reporting location information, at least one reporting mode being associated with detection of the reference radio access network entity.

As is discussed in more detail below, adapting the mode of reporting location information may comprise suspending the reporting of (explicit) geo-location information (e.g. determined using a GNSS system). Depending on the mode which results from the adaptation, all reporting of location information may be suspended such that no location information is reported during timeslots allocated for reporting of location information or, alternatively, reporting of (explicit) geo-location information may be suspended and replaced, temporarily at least, by reporting of implied location information.

Implied location information may be information which does not explicitly identify an entity's (e.g. a UE's) location but which allows a geo-location of the entity to be determined. For instance, implied location information may include information identifying a RAN reference entity, the location of which is known, which is in the vicinity of the UE. Thus, the implied location information may be used to estimate a location of the UE from which the implied location information is received, based on the known location of the reference entity.

In some examples, when reporting of (explicit) geo-location information is replaced by reporting of implied location information, the UEs may additionally transmit the movement information (e.g. relating to velocity and/or direction/heading of the UEs) along with the implied location information. In other examples, such as when the UE is not configured to transmit the movement information along with the geo-location information, the implied location information may be transmitted in the absence of movement information. When the UE is operating the mode in which all reporting of location information (both implied and explicit) is suspended, the UE may, in some examples, transmit movement information during the timeslots allocated for reporting of location information, while in other examples, movement information may not be transmitted.

The detection of the RAN reference entity 8 within the vicinity of the UE may be based on receipt by the UE 6 of a message from the RAN reference entity 8. The message may include location reporting assistance information. The location reporting assistance information may indicate to the UE 6 that a location of the RAN reference entity 8 is known to the network infrastructure (e.g. the eNB 7 or the server apparatus 3). The location reporting assistance information may further include an identifier associated with the RAN reference entity. The identifier may have been allocated by an eNB 7 of the network.

The UE control apparatus 60 may be configured to respond to receiving the message including the location reporting assistance information indicating that the location of RAN reference entity 8 is known by adapting the reporting mode in such a way that reporting of explicit geo-location information is suspended and instead one or more messages including implied location information is caused to be transmitted by the UE 6 to the serving eNB 7. The implied location information may be in the form of an identifier associated with the detected RAN reference entity 8. Based on receipt of this message, the eNB 7 or server apparatus is able to determine that the UE 6 is in the vicinity of the RAN reference entity 8. Therefore, based on the known location of the RAN reference entity 8, the eNB 7 or server apparatus 3 is able to determine a rough location of the UE 6 (which is within a range of the RAN reference entity 8). Moreover, since transmission of the identifier associated with the RAN reference entity 8 may be less data intensive than the geo-location information, the amount of data traffic and interference may be reduced.

As the reporting of geo-location information uses more data than reporting of implied location information, the explicit location information may be referred to as "extended location information" and the implied location information may be referred to as "compacted location information". As such, it could be said that, in some of the examples described herein, the UE is configured, in response to detecting a RAN reference entity in the vicinity, to switch from reporting of extended location information to reporting of compacted location information.

Typically, a RAN reference entity 8 which transmits messages including location reporting assistance information indicating that the location of RAN reference entity is known may be a UE-type entity. In some alternative examples, however, eNB-type RAN reference entities 8 may be configured to transmit messages of this type.

In some examples, the identifier associated with the RAN reference entity 8 may have been provided to the UE 6 by one of the eNBs 7 prior to detection of the RAN reference entity thereby to enable to the UE to recognise the RAN reference entity 8 as having a known location. For instance, the eNB 7 may provide the UE 6 with a list of identifiers of one or more RAN entities when the UE enters a cell 5 operated by the eNB 7. Alternatively, the eNB 7 may provide the identifiers of RAN reference entities 8 at any time, for instance in response to receiving updated information from the server apparatus 3 (see, for example, operation S3.1 of FIG. 3) In other examples, the identifiers of the RAN reference entities 8 may not be provided to the UEs 6 in advance. Instead, the message received from the RAN reference entity 7 may include signalling information (e.g. an indicator such as a flag) which indicates that the location of the RAN reference entity 8 is known.

The UE control apparatus 60 may be configured, alternatively or additionally, to adapt the mode of reporting of location information based on location reporting assistance information in the message received from the RAN reference entity 8, which indicates the capability of the RAN reference entity 8 to perform location reporting on behalf of the UE 6. For instance, the RAN reference entity 8 may be capable to report to the eNB 7 that the UE 6 is in the vicinity of the RAN reference entity 8. In some examples, the report by the RAN reference entity 8 may include information identifying plural UEs in its vicinity. Based on this information and the known location of the RAN reference entity 8, the eNB 7 or associated server apparatus 3 may be operable to determine a rough estimation of the locations of the UEs 6. A UE 6 which allows a RAN reference entity 8 to perform location reporting on its behalf may be configured to transmit no information at all during the timeslots allocated for reporting of location information. This may significantly reduce the network traffic resulting from V2X communication, particularly if the RAN reference entities 8 transmit individual reports identifying multiple UEs.

As will be appreciated from the above, the UEs 6 may be capable of operating in at least two of three location reporting modes. The first mode in which the UE 6 transmits explicit geo-location information during its allocated timeslots may be referred to as "explicit geo-location reporting mode". The second mode in which the UE 6 transmits the identifier associated with a RAN reference entity 8 may be referred to as "implied location reporting mode". Finally, the mode in which the RAN reference entity 8 informs the eNB 7 of the location of the UE 6 (while the UE 6 transmits neither geo-location information nor RAN reference entity identification information) may be referred to as "passive location reporting mode". The implied location reporting modes and the passive location reporting modes may be referred to as assisted location reporting modes.

In terms of network traffic and resource use by the UEs 6, the passive location reporting mode may be the most efficient, followed by the implied location reporting mode and finally the explicit geo-location reporting mode. When configuring the UE 6, the eNB 7 may be configured to indicate in the configuration information which modes should take priority, if available. This information may be referred to as location reporting mode priority information and may indicate relative priorities of at least two location reporting modes. Specifically, the configuration information may indicate that the passive location reporting mode and/or the implied location reporting mode should be utilised, if available, in preference to the explicit geo-location reporting mode. Also, if the network is configured to allow UEs to operate in all three modes, the configuration information may additionally indicate that the passive location reporting mode should be utilised if available, in preference to the implied location reporting mode.

The UEs 6 may be configured to operate in a particular one of the passive location reporting mode and the implied location reporting mode, in which reporting of geo-location information is suspended, until it is determined by the UE 6 that it is no longer in the vicinity of the RAN reference entity 8. The UE 6 may thus be configured to respond to a determination that the previously-detected RAN reference entity 8 is no longer within the vicinity of UE 6 by causing resumption of the original mode of reporting. This may include resuming reporting of geo-location information identifying the location of the user equipment. Put another way, the UE 6 may re-enter the explicit geo-location reporting mode.

In either of the explicit geo-location reporting and the implied location reporting mode, the UE control apparatus 60 may be configured to respond to a determination that a scheduled uplink transmission interval for the UE falls within an acceptable offset from an interval allocated to the UE for reporting of location information by causing the reporting of the geo-location information or a substitute for the geo-location information (i.e. the implied location information, such as the RAN reference entity identification information) to be performed in the scheduled uplink transmission interval. By combining separately scheduled transmissions into a single allocated uplink transmission slot, the network traffic resulting from V2X communication may be reduced. An acceptable offset may be for instance 10 milliseconds.

As will be appreciated, the passive location reporting mode and the implied location reporting mode may both result in the level of resolution of the location of the UE 6 being reduced when compared to the possible resolution available using the explicit geo-location reporting mode. However, the reduced level of resolution may be sufficient for many, if not all, of the operations which may be performed based on locations of the UEs 6 in a V2X communications system. This may be particularly true when the distances between RAN reference entities 8, such as RSUs, are in the order of 30 metres. Consequently, the benefits (including reduced network traffic) which result from operation of the UEs 6 in either of the passive location reporting mode and the implied location reporting mode may outweigh any negative effects which may result from the lowered resolution of location.

As will be appreciated from the above discussion (which was primarily in respect of the UEs 6), eNBs 7, for instance under the control of eNB control apparatus 70, may be configured to receive information from a UE 6 including an identifier associated with a RAN reference entity in the vicinity of the UE or from the RAN reference entity including an identifier of the UE. The eNB 7 may be configured then to determine a geo-location of the UE based on the received information and information identifying a location of the RAN reference entity. Alternatively or additionally, the eNB 7 may be configured to forward the received information, for instance to a server apparatus 3 in a vehicle-to-X communications system thereby to enable determination of the geo-location of the user equipment based on the forwarded information and information identifying the location of the RAN reference entity 8.

The eNB 7 may be operable to configure one or more RAN reference entities 8 within its coverage area by providing an instruction/configuration information to the RAN reference entity 8 which causes the RAN reference entity 8 to advertise to UEs 6 a capability of the RAN reference entity 8 to report location information on behalf of the UE 6. As discussed above, in response to receiving such an advertisement, the UE 6 may switch to operating in passive location reporting mode. Of course, the UE 6 may additionally acknowledge the advertisement, which may provide the identifier of the UE 6 to the RAN reference entity 8. As discussed above, RAN reference entities 8 which are configured in this way may typically be of the eNB-type.

The eNB 7 may be operable alternatively or additionally to configure one or more RAN reference entities within its coverage area by providing instruction/configuration information for causing the RAN reference entity 8 to advertise to UEs 6 in the vicinity of the RAN reference entity 8 that the location of the RAN reference entity is known. The advertisement may include the identifier associated with the RAN reference entity 8. As discussed above, this may have been allocated by the eNB 7 and included in the instruction/configuration information provided by the eNB 7. The configuring of RAN reference entities 8 in this way may typically, but not exclusively, apply to those of the UE-type.

The eNB 7 may be further configured to select one or more RAN reference entities 8 to which to send configuration information on the basis of information received from vehicle-to-X communications server apparatus. The received information may for instance indicate a geo-location (e.g. of traffic incident) and the eNB 7 may respond by selecting RAN reference entities 8 which are known to be within a particular distance and/or in a particular direction of the geo-location. Alternatively, the information received by the eNB 7 may specify explicitly which RAN reference entities 8 should be selected by the eNB 7.

The eNB 7 may, in some examples, be configured to cause transmission to a UE 6 being served by the eNB 7 of configuration information for causing the UE 6 to adapt the mode of reporting of location information in response to detecting a RAN reference entity 8 in the vicinity of the UE. In some examples, the configuration information may include the identifier associated with the RAN reference entity 8. As discussed above, the configuration information transmitted to the UE 6 may include an indication of priorities of different behaviours (or modes of operation) of the UE 6. Also as discussed above, the different behaviours may include reporting geo-location information (i.e. the explicit geo-location reporting mode) and at least one of transmitting to the eNB 7 the identifier associated with the detected RAN reference entity 8 instead of the geo-location information (the implied location reporting mode) and responding to determination that the detected RAN reference entity is capable of reporting the location of the UE on behalf of the UE by suspending all transmissions of location information during intervals allocated to the user equipment for reporting of location information (the passive location reporting mode).

As will be appreciated from the above discussion (which was primarily from the perspective of the UEs 6 and eNBs 7), the RAN reference entities 8 are configured to announce or advertise location reporting assistance information to one or more UEs within a vicinity of the RAN reference entity. The location reporting assistance information includes one of an indication that the RAN reference entity 8 is operable to report location information to an eNB on behalf of the UE, and an indication that a location of the RAN reference entity is known. As discussed above, if the location reporting assistance information includes the indication that the RAN reference entity 8 is operable to report location information on behalf of the UE, the UE 6 may respond by switching to the passive location reporting mode. If the location reporting assistance information includes the indication that the location of the RAN reference entity 8 is known, the UE 6 may respond by switching to the implied location reporting mode.

The location reporting assistance information including the indication that the location of the RAN reference entity 8 is known may, as discussed above, include the identifier associated with the RAN reference entity 8. The identifier may have been provided to the RAN reference entity 8 by an eNodeB. The presence of the identifier in the assistance information may constitute the indication that the location of the RAN reference entity 8 is known.

In some examples, the assistance information including the indication that the location of the RAN reference entity 8 is known may include one or more identifiers of one or more eNBs to which the location of the RAN reference entity 8 is known. This may allow the UE 6 to continue to operate in the implied location reporting mode even when the UE 6 switches between cells, assuming the eNB of the newly entered cell was indicated in the assistance information.

As also discussed above, in examples in which the location reporting assistance information includes the indication that the RAN reference entity 8 is operable to report location information to the eNodeB on behalf of the UE, the RAN reference entity 8 may be further configured to respond to detection of the UE 6 in the vicinity of the RAN reference entity 8, by reporting to the eNB 7 that the UE 6 is in the vicinity of the RAN reference entity 8. The reporting to the eNB 7 may be performed in response to receiving permission from the UE 6 to do so.

Figure 2:
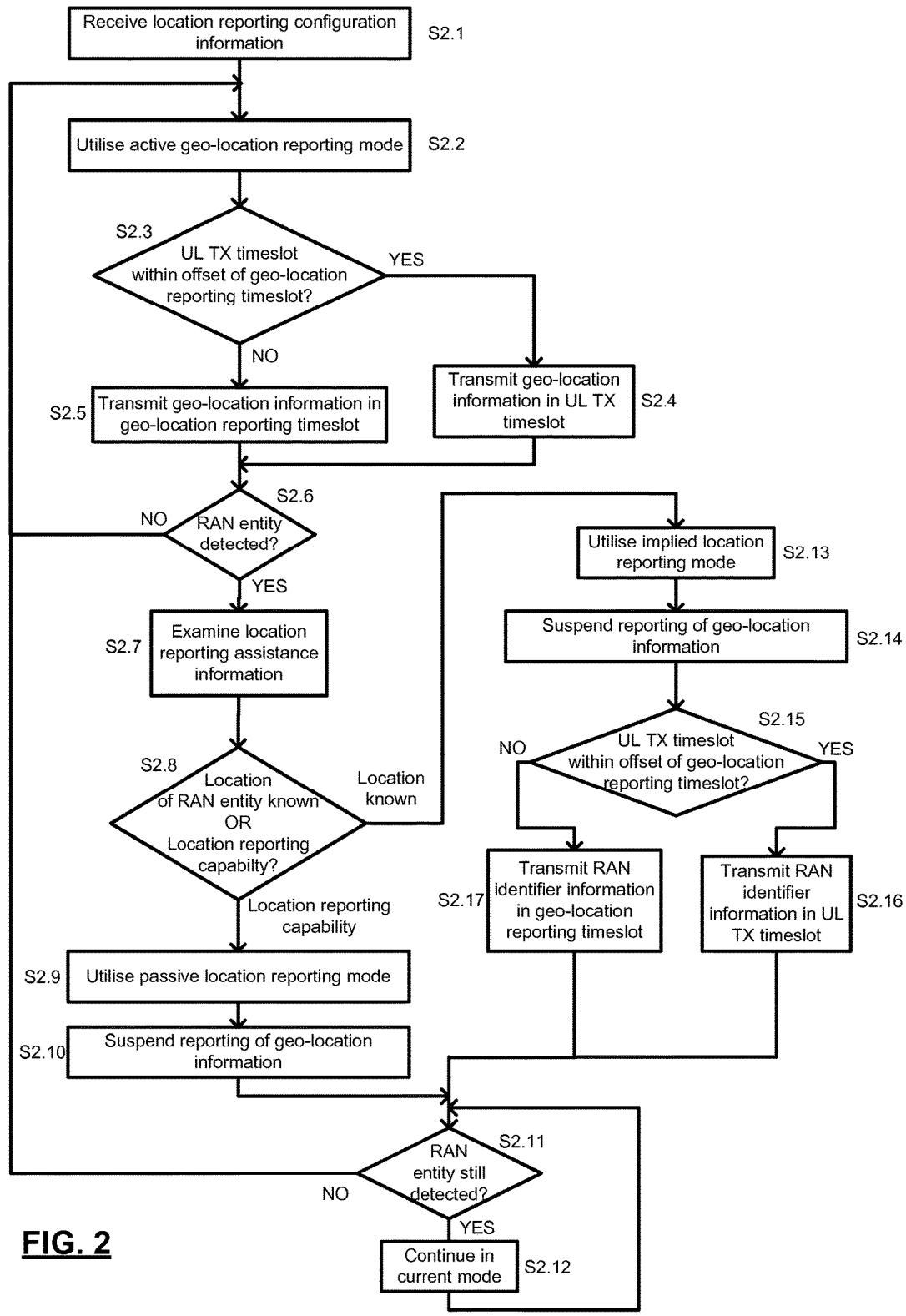
FIG. 2 is a flow chart illustrating various operations which may be performed by a UE operating within the network of FIG. 1.

FIG. 2 is a flow chart illustrating various operations which may be performed by the control apparatus 60 of a UE 6 of a network such as that of FIG. 1, which may be configured for V2X communications. As will be appreciated, at least some of the operations may correspond to operations discussed above with reference to FIG. 1.

In operation S2.1, the UE 6 receives location reporting configuration information from the eNB 7.

The location reporting configuration information may include RAN reference entity identification information. This may include identifiers associated with RAN reference entities and may indicate to UE 6 the RAN reference entities which have known locations and/or which are capable of reporting location information on behalf of the UE 6.

The location reporting configuration information may additionally or alternatively include trigger information for indicating to the UEs 6 how they should respond to detecting a RAN reference entity. For instance, the instructions may indicate that the UE 6 should switch to implicit location reporting mode in response to detecting a RAN reference entity 8 having a known location and/or that the UE 6 should switch to the passive reporting mode in response to detecting a RAN reference entity 8 which is capable of reporting location information on behalf of the UE 6.

The location reporting configuration information may include priority information indicating relative priorities of two or more available modes of operation. For instance, the priority information may indicate that the UE 6 should operate in passive location reporting mode whenever possible. Alternatively or additionally, the priority information may indicate that the UE 6 should operate in implicit location reporting mode in preference to operating explicit location reporting mode.

In operation S2.2, the UE 6, in the absence of a detected RAN reference entity, utilises explicit geo-location reporting mode in which it may be configured to transmit geo-location information (for instance derived using GNSS or any other suitable mechanism) to its serving eNB 7 in regular timeslots (location information reporting timeslots).

In operation S2.3, the UE 6 determines if there is an uplink transmission timeslot scheduled for a time that within an acceptable offset of a geo-location reporting timeslot. The timing of an uplink transmission timeslot may have been indicated via a received uplink scheduling grant. The acceptable offset may be pre-programmed into the UE 6 or may be indicated by the location reporting configuration information. The acceptable offset may be, for instance, 10 milliseconds.

In response to a positive determination in operation S2.3 (i.e. a determination that there is an uplink transmission timeslot scheduled for a time that is within an acceptable offset of a geo-location reporting timeslot), the UE 6 may proceed to operations S2.4.

Operation S2.4 may comprise delaying or advancing transmission of the geo-location information and transmitting the geo-location information in the scheduled uplink transmission timeslot, for instance along with any uplink signalling messages that are scheduled to be transmitted to the eNB in the uplink transmission timeslot.

In other examples, if the uplink transmission time slot and the geo-location reporting timeslot are within an acceptable offset of one another, the UE 6 may be configured to combine or interchange the transmission of geo-location information and any data uplink transmission in some other way. As such, the UE 6 may be configured to transmit the data for uplink transmission with the geo-location information in the geo-location reporting timeslot and/or to transmit the data for uplink transmission in the geo-location reporting timeslot and vice versa.

After operation S2.4, the UE 6 proceeds to operation S2.6.

In response to a negative determination in operation S2.3 (i.e. a determination that there is not an uplink transmission timeslot scheduled for a time that is within an acceptable offset of a geo-location reporting timeslot), the UE 6 may proceed to operations S2.5. In operation S2.5, the UE 6 transmits geo-location information to the eNB 7 in the scheduled location information reporting timeslot.

After operation S2.5, the UE 6 proceeds to operation S2.6.

In operation S2.6, the UE 6 determines if a RAN reference entity 8 has been detected. If no RAN reference entity is detected, the UE 6 continues to utilise the explicit geo-location reporting mode in operation S2.3.

If a RAN reference entity 8 is detected, the UE 6 may proceed to operation S2.7. In some examples, a positive determination may only be reached in operation S2.6 if the RAN reference entity 8 indicates that that it can provide location reporting assistance to the UE 6. This may be indicated by a flag in an announcement transmitted by the RAN reference entity 8. The flag may, for instance, indicate that the announcement includes location reporting assistance information. Alternatively, the flag in the announcement may indicate that location assistance information is available from the RAN reference entity on request. In an example such as this, the UE 6 may respond to detection of the flag, by requesting the location reporting assistance information from the RAN reference entity.

In operation S2.7, the UE 6 examines location reporting assistance information received from the RAN reference entity 8. As mentioned previously, the location reporting assistance information may be carried by the announcement from the RAN reference entity 8 or in another message received from the RAN reference entity 8 at the request of the UE 6.

Subsequently, in operation S2.8, the UE 6 determines whether the location reporting assistance information indicates that the location of the RAN reference entity 8 is known or whether the RAN reference entity is capable of reporting location information on behalf of the UE 6.

The location of the RAN reference entity 8 being known may be indicated for instance via an indicator in the received location reporting assistance information. The indicator may include a flag, or an identifier associated with the RAN reference entity 8.

In some examples, a format of the indicator may imply that the location is known. In other examples, the UE may recognise the identifier associated with the RAN reference entity, for instance because it was received with the configuration information of operation S2.1 and so may understand that the location of the RAN reference entity is known.

Similarly, the capability of the RAN reference entity to transmit location information on behalf of the UE 6 may be indicated by an indicator (e.g. a flag) in the location reporting assistance information.

If it is determined that the RAN reference entity 8 is capable of transmitting location information on behalf of the UE 6, the UE 6 proceeds to operation S2.9 in which it switches to utilising passive location reporting mode. Switching to this mode may include indicating to the RAN reference entity 8 that the RAN reference entity 8 should report the location of the UE 6 on the UE's behalf.

In the passive location reporting mode, the UE 6 suspends reporting of explicit geo-location information (operation S2.10). Moreover, the passive reporting mode may include the UE 6 not transmitting any location information during timeslots allocated for reporting location information.

Use of the passive location reporting mode may continue until the detected RAN reference entity is determined to no longer be in the vicinity of the UE 6. As such, after operation S2.10, the UE 6 may proceed to operation S2.11 to determine if the RAN reference entity 8 is still detected. If it is determined that the RAN reference entity 8 is no longer detected, the UE 6 returns to operation S2.2 in which the UE switches to the explicit geo-location reporting mode. If it is determined that the RAN reference entity is still detected, the UE 6 continues to operate (operation S2.12) in the current mode, which in this case is the passive location reporting mode in which the suspension of the reporting of the explicit geo-location information is maintained.

If, in operation S2.8, the UE 6 determines that the location reporting assistance information indicates that the location of the RAN reference entity 8 is known, the UE 6 proceeds to operation S2.13, in which the implied location reporting mode is used. In this mode, the UE 6 suspends reporting of explicit geo-location information (operation S2.14).

Instead, the UE 6 may report implied location information, such as an identifier of the RAN reference entity. However, similarly to operation S2.3, the UE may first, in operation S2.15, determine if the geo-location reporting timeslot and a scheduled uplink transmission timeslot are within an acceptable offset of one another.

If a positive determination is reached in operation S2.15, the UE 6 may (in operation S2.16) cause the implied location information to be transmitted in the scheduled uplink transmission timeslot, for instance along with any uplink signalling messages that are due to be sent. Alternatively, the UE 6 may cause any uplink signalling messages that are due to be sent to be transmitted with the implied location information in the location information reporting timeslot.

If a negative determination is reached in operation S2.15, the UE 6 may (in operation S2.17) cause the implied location information to be transmitted in geo-location reporting timeslot.

After transmitting the implied location information in operations S2.16 or S2.17, the UE 6 may proceed to operation S2.11. If, in operation S2.11, the RAN reference entity is no longer detected, the UE 6 may return to operation S2.2, in which it reverts to using the explicit geo-location reporting mode. If, however, the RAN reference entity is still detected, the UE 6 continues to use the current mode (in this case, the implied location reporting mode).

In some examples, when operating in the implied location reporting mode, the UE 6 may be configured to transmit the implied location information, including for instance the identifier of the RAN entity, only once, thereby to save data traffic. In such examples, the eNB 7 or server apparatus 3 may assume that the UE 6 is still in the vicinity of the RAN reference entity 8 identified in the received instance of implied location information until it is informed otherwise, for instance via receipt of explicit geo-location from the UE or receipt of implied location information identifying another RAN reference entity 8. This may be particularly suitable, for instance, when the transportation system is congested and so the vehicles are not moving quickly.

Although not shown in FIG. 2, in some examples, the UE 6 may be detect new RAN reference entities while operating in one of the passive or implied location reporting modes. In such examples, the UE 6 may refer to the priority information which may have been received in operation S2.1. Thus, the UE 6 may, depending on the location reporting assistance information of the newly detected RAN reference entity, determine whether to switch to a different mode based on the priority information. For instance, if the priority information indicates that the passive location reporting mode should be used wherever possible, the UE 6 may switch from the implied location reporting mode to the passive location reporting mode but not vice versa.

Figure 3:
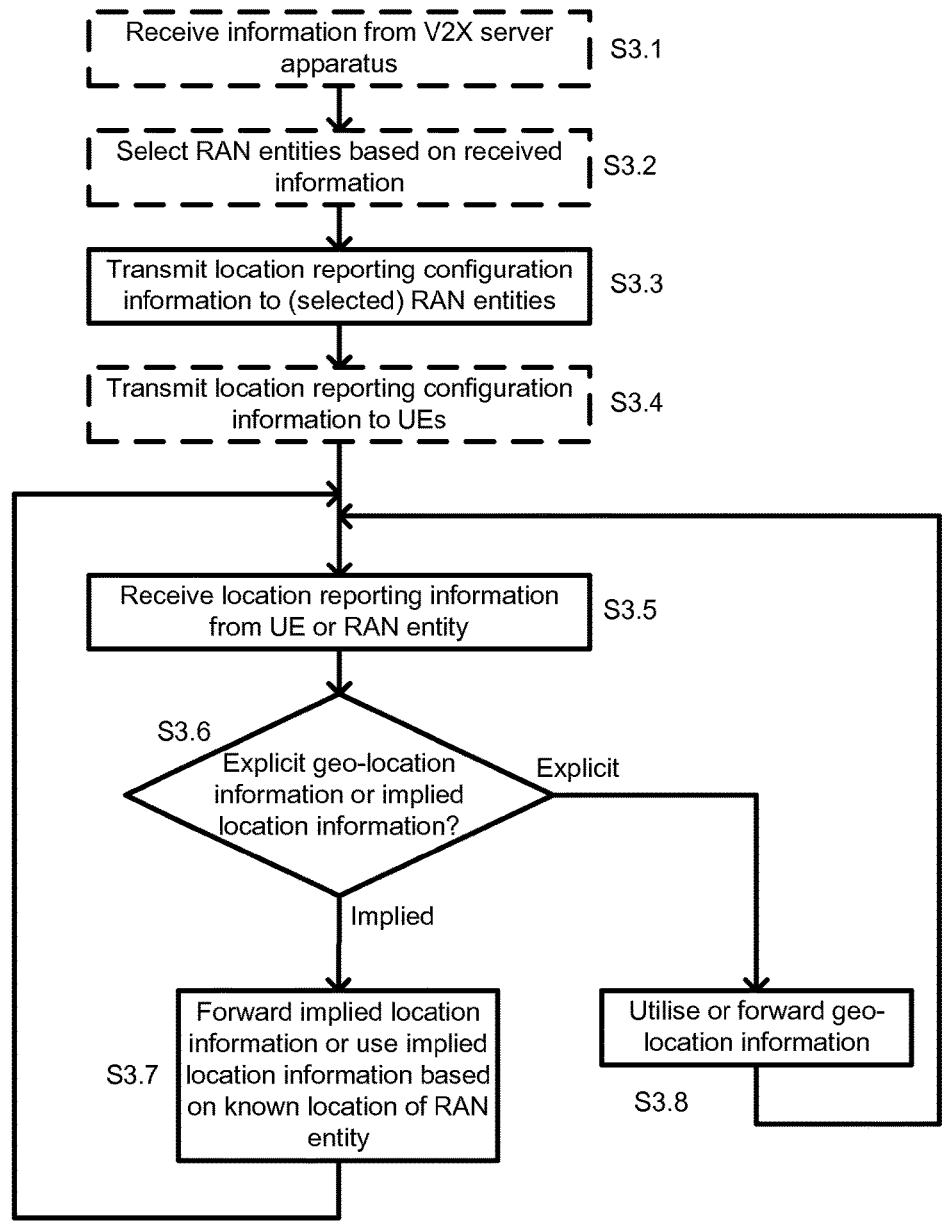
FIG. 3 is a flow chart illustrating various operations which may be performed by an eNB operating within the network of FIG. 1.

FIG. 3 is a flow chart illustrating various operations which may be performed by the control apparatus 70 of an eNB 7 of a network such as that of FIG. 1, which may be configured for V2X communications. As will be appreciated at least some of the operations may correspond to operations discussed above with reference to FIG. 1 and FIG. 2.

In operation S3.1, the eNB 7 may receive information from a server apparatus 3, for instance a V2X communications server apparatus. This information may include geo-location information, for instance identifying a location of a traffic incident. Alternatively or additionally, the information may explicitly identify one or more RAN reference entities.

In operation S3.2, the eNB may select RAN reference entities to which to send configuration information. The selection may be made based on the received information. As mentioned previously, in some examples, the selected RAN reference entities 8 may include one or more vehicle UE 6.

In operation S3.3, the eNB 7 transmits location reporting assistance configuration information to the selected RAN reference entities 8 within its coverage area. The configuration information may, as discussed above include an indication of geo-location reporting assistance information which the RAN reference entity 8 should advertise to UEs 6 in the vicinity.

In operation S3.4, the eNB 7 may transmit assisted location reporting configuration information to one or more UEs 6 that it is serving. This may include, for instance, trigger information, indicating detectable triggers in response to which the UE 6 should operate in a particular way. The location reporting configuration information may include priority information indicating priorities with respect to the different modes of location reporting. The location reporting configuration information may include identifiers associated with RAN reference entities whose locations are known and, in some examples, also identities of eNBs 7 which know the locations of the RAN reference entities.

After configuring the RAN reference entities and/or the UEs, the eNB 7 may receive location reporting information from either of RAN reference entities 8 or UEs within its cell.

As discussed above, the location reporting information received from the UEs 6 may include either explicit geo-location reporting information or implied location information (in particular, an identifier of a RAN reference entity 8). Location reporting information received from RAN reference entities may include an indication of one or more UEs which are in the vicinity of the RAN reference entity (e.g. identifiers of those UEs). As such, upon receipt of the location information, the eNB 7 may, in operation S3.6, determine whether the received location information is explicit or implied location information.

If the received information is explicit geo-location information, the eNB in operation S3.7 may utilise the geo-location information, or forward it to another entity, for instance the server apparatus 3, for use by the other entity.

If, however, the received location information is implied location information, for instance an identifier of a UE 6 (if received from a RAN reference entity 8) or an identifier associated with a RAN reference entity 8 (if received from a UE 6), the eNB 7 proceeds to operation S3.7. In operation, S3.7, the eNB 7 may forward the implied location information to another entity (e.g. the V2X server apparatus 3) for use in determining the location of the UE 6 to which the location information relates based on the known location of the RAN reference entity 8 from which the implied location information was received or which was identified in the implied location information. Alternatively, the eNB 7 may determine the location of the UE 6 to which the implied information relates based on the known location of the RAN reference entity 8 from which the implied location information was received or which was identified in the implied location information.

After either of operations S3.7 and S3.8, the eNB 7 may return to operation S3.5.

Figure 4:
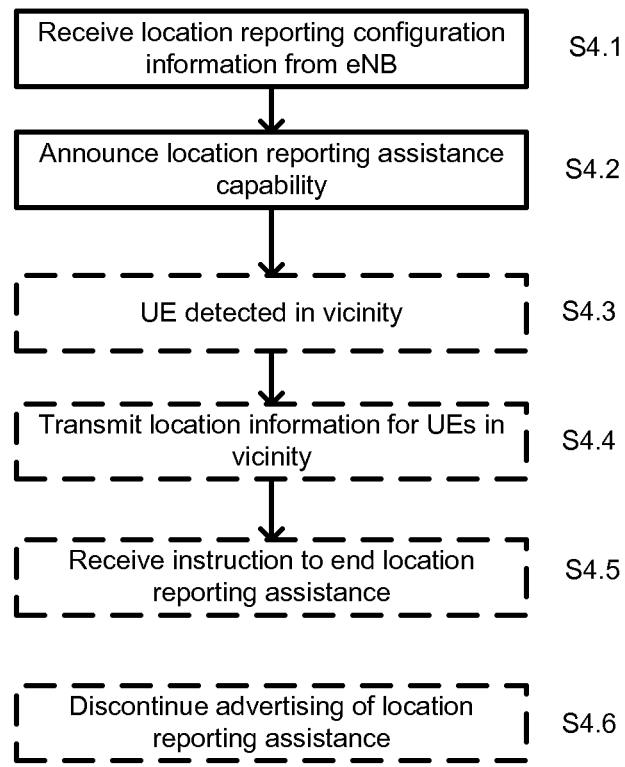
FIG. 4 is a flow chart illustrating various operations which may be performed by a RAN reference entity operating within the network of FIG. 1.

FIG. 4 is a flow chart illustrating various operations which may be performed by the control apparatus of a RAN reference entity 8 of a network such as that of FIG. 1, which may be configured for V2X communications. As will be appreciated at least some of the operations may correspond to operations discussed above with reference to FIGS. 1 to 3.

In operation S4.1, the RAN reference entity 8, which may be a roadside unit (RSU) in a network configured for V2X communications, may receive location reporting assistance configuration information from an eNB 7.

The location reporting assistance configuration information received may depend on the type of the RAN reference entity 8. For instance, an eNB-type RAN reference entity may be configured to report implied locations of UEs so that individual UEs in the coverage area of the eNB type RAN reference entity is able to suspend the reporting of geo-location information. A UE-type RAN reference entity 8 may be configured with an associated identifier (which may be termed a "reference ID") so that UEs are able to report the identifier as implied location information instead of explicit geo-location information.

In response to receipt of the configuration information, the RAN reference entity 8 may begin to announce its location reporting assistance capability (operation S4.2). Put another way, the eNB 7 may control the RAN reference entity 8 to start providing location reporting assistance to UEs. The announcements may be broadcast messages which include the location reporting assistance information. Alternatively, the announcements may only indicate that the RAN reference entity 8 is able provide location reporting assistance. In such examples, UEs 6 may request receipt of the location assistance information, which may be sent by the RAN reference entity 8. As discussed previously, the location reporting assistance information may include an identifier of the RAN reference entity 8 or an indication of the capability of the RAN reference entity 8 to report location information on behalf of UEs 6.

In examples in which the RAN reference entity 8 is capable of reporting location information on behalf of UEs, the RAN reference entity may, in operation S4.3, detect a UE 6 in the vicinity based on a message received from the UE 6. In some examples, operation S4.3 may further comprise receiving a request/command from the UE 6 in the vicinity that the RAN reference entity 8 should begin reporting the location of the UE 6 on behalf of the UE 6.

The RAN reference entity 8 may respond to detection of the UE in the vicinity by causing performance of operation S4.4. In operation S4.4, the RAN reference entity may transmit implied location information for the UE 6 to the eNB 7. The eNB 7 to which the implied location information is transmitted may be the eNB 7 from which the configuration information was received. Alternatively, the eNB 7 to which the implied location information is transmitted may be the eNB 7 which is indicated to the RAN reference entity 8 by the UE 6.

The RAN reference entity 8 may continue the announcements of operation S4.2 until it receives a request/command, in operation S4.5, from the eNB 7 (which may be the eNB from which the configuration information was received) to discontinue the announcements of its location reporting assistance ability.

The RAN reference entity 8 may respond to this by discontinuing the announcements in operation S4.6.

As will of course be appreciated, in examples in which the RAN reference entity 8 is a UE 6 (e.g. a vehicle UE), the RAN reference entity 8 may also regularly report its geo-location to the eNB 7 by which it is being served. UEs 6 which are selected as RAN reference entities 8 may not be allowed to operate in anything other than explicit geo-location reporting mode.

Figure 5:
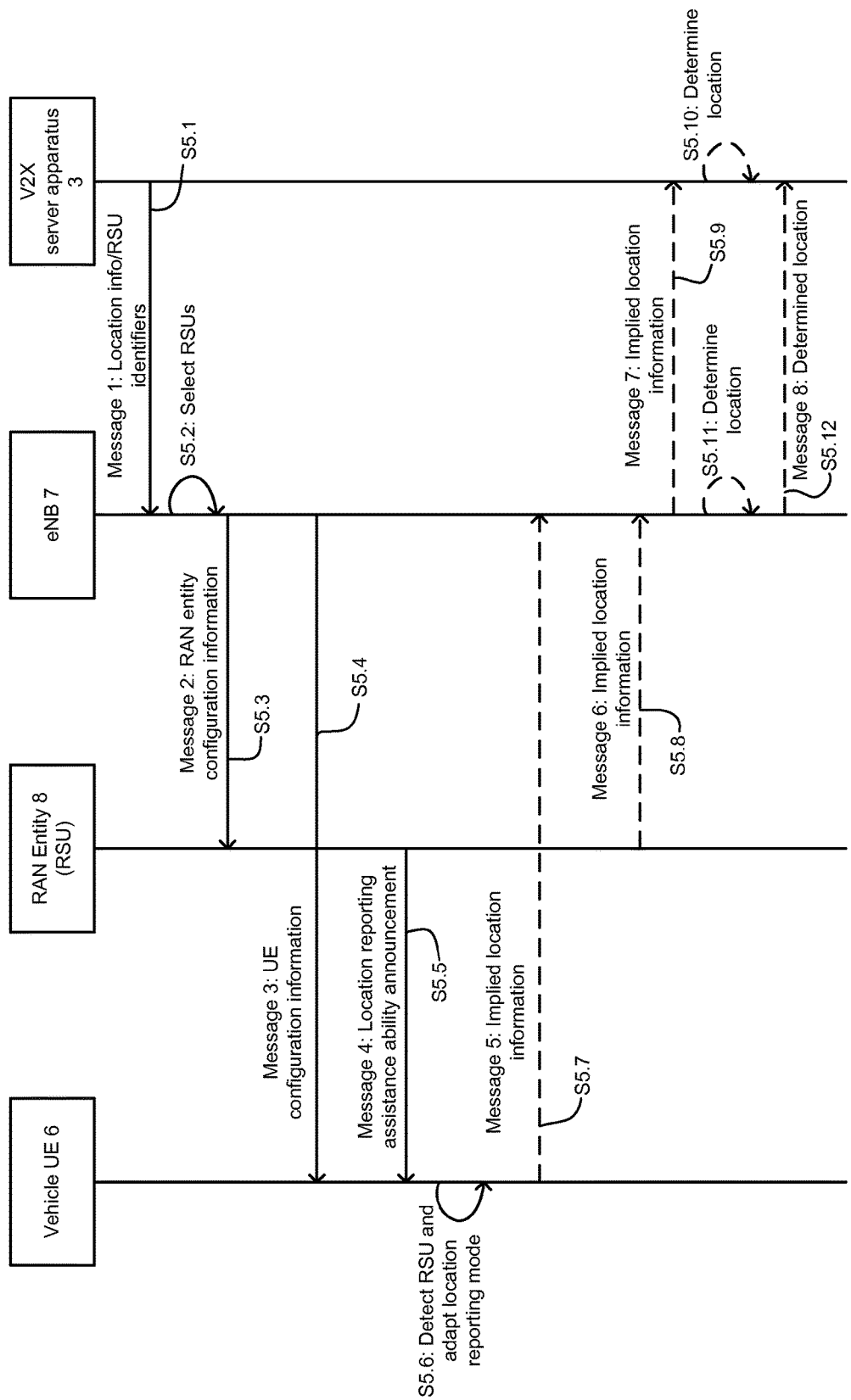
FIG. 5 is a message flow illustrating various operations which may be performed, and messages which may be exchanged, by the elements of a V2X-capable network.

FIG. 5 is a message flow diagram illustrating a flow of messages between the various entities which may make us a V2X-capable communications network. As will be appreciated, all of the messages and operations shown in FIG. 5 may correspond with messages and operations described above with reference to FIGS. 1 to 4.

In the example of FIG. 5, four elements of the V2X capable network are shown. These are a vehicle UE 6, an eNB 7, a RAN reference entity 8 in the form of an RSU, and a V2X server apparatus 3.

In operation S5.1, the V2X server apparatus 3 transmits to the eNB 7 a first message. The message may include location information, for instance indicating a congested area. The location information may include explicit geo-location information or may include identifiers of various RSUs 8.

In operation S5.2, the eNB 7 selects RSUs 8 based on the received information.

In operation S5.3, the eNB 7 transmits a second message to one or more RSUs 8 which was selected in operation S5.2. The second message includes location reporting assistance configuration information. As discussed with respect to, for instance, operation S4.1 of FIG. 4, this configuration information, and the way in which the RSU responds, may be different depending on the type of the RSU 8 (i.e. eNB-type and UE-type).

In operation S5.4, the eNB 7 may transmit a third message to one or more UEs 6 that it is currently serving. The third message may include assisted location reporting configuration information for configuring the behaviour of the UEs. The assisted location reporting configuration information may be as described with reference to, for instance, operation S2.1 and S3.4 of FIGS. 2 and 3 respectively.

In operation S5.5, the RSU 8 transmits a fourth message, which may be an announcement or advertisement of its location reporting assistance ability. This may be as discussed above with respect to, for instance, operations S4.2 and S2.6 and S2.7 of FIGS. 4 and 2.

In operation S5.6, based at least in part on the announcement, the UE 6 may detect the RSU 8 in the vicinity and may respond by adapting its mode of reporting of location information by suspending transmission to the eNB 7 of explicit geo-location reports.

Depending on the location reporting assistance offered by the RSU 8, the UE 6 may enter the implied location information reporting mode and, in operation S5.7, may transmit a fifth message to the eNB 7, including implied location information (e.g. an identifier of the RSU 8). Alternatively, the UE 6 may enter the passive location information reporting mode in which it (at least temporarily) reports no location information. When in the UE 6 has entered this mode, the RSU may, in operation S5.8, transmit a sixth message to the eNB 7, including implied location information (e.g. an identifier of the UE).

The eNB 7 may forward a seventh message to the V2X server apparatus 3 in operation S5.9. The V2X server apparatus may then in operation S5.10, use the implied location information and a known location of the RSU 8 to determine an estimated location of the UE 6. Alternatively, the eNB 7 may, in operation S5.11, use the implied location information and a known location of the RSU 8 to determine an estimated location of the UE 6. The estimated location of the UE 6 may then be forwarded to the V2X server apparatus 3 in an eighth message in operation S5.12.

As discussed previously, the estimated location information of the UEs 6 may be used for instance to control a flow of traffic within an area covered by the V2X capable network.

FIG. 6 is a schematic illustration of an example configuration of one or more of the UEs 6 depicted in FIG. 1, which may be used for communicating with the eNBs 7 and the RAN reference entities via a wireless interface. The UE 6 may be any device capable of at least sending or receiving radio signals to or from the eNBs 7 and of performing various operations described above with respect to FIGS. 1 to 5. In some examples, the UEs 6 may be integrated or otherwise carried in a vehicle (may be a vehicle UE).

The UE 6 may communicate via an appropriate radio interface arrangement 605 of the UE 6. The interface arrangement 605 may be provided for example by means of a radio part 605-2 (e.g. a transceiver) and an associated antenna arrangement 605-1. The antenna arrangement 605-1 may be arranged internally or externally to the UE 6.

As discussed above, the UE 6 comprises control apparatus 60 which is operable to control the other components of the UE 6 in addition to performing any suitable combinations of the operations described in connection with UE 6 with reference to FIGS. 1 to 5. The control apparatus 60 may comprise processing apparatus 601 and memory 602. Computer-readable code 602-2A may be stored on the memory, which when executed by the processing apparatus 601, causes the control apparatus 60 to perform any of the operations described herein in relation to the UE 6. Example configurations of the memory 602 and processing apparatus 601 will be discussed in more detail below The UE 6 may be, for example, a device that does not need human interaction, such as an entity that is involved in Machine Type Communications (MTC). Alternatively, the UE 6 may be a device designed for tasks involving human interaction such as making and receiving phone calls between users, and streaming multimedia or providing other digital content to a user. Non-limiting examples include a smart phone, and a laptop computer/notebook computer/tablet computer/e-reader device provided with a wireless interface facility.

Where the UE 6 is a device designed for human interaction, the user may control the operation of the UE 6 by means of a suitable user input interface UII 604 such as key pad, voice commands, touch sensitive screen or pad, combinations thereof or the like. A display 603, a speaker and a microphone may also be provided. Furthermore, the UE 6 may comprise appropriate connectors (either wired or wireless) to other devices and/or for connecting external accessories, for example hands-free equipment, thereto.

FIG. 7 is a schematic illustration of an example configuration of one or more the eNBs 7 depicted in FIG. 1, which may be used for communicating with the UEs 6 and UE-type RAN reference entities 8 via a wireless interface. The eNB 7, which may be referred to a base station or access point (AP) comprises a radio frequency antenna array 701 configured to receive and transmit radio frequency signals. Although the eNB 7 in FIG. 7 is shown as having an array 701 of four antennas, this is illustrative only. The number of antennas may vary, for instance, from one to many hundreds.

The eNB 7 further comprises radio frequency interface circuitry 703 configured to interface the radio frequency signals received and transmitted by the antenna 701 and a control apparatus 70. The radio frequency interface circuitry 703 may also be known as a transceiver. The apparatus 70 may also comprise an interface 709 via which, for example, it can communicate (e.g. via X2 messages) with other network elements such as the other eNBs 7 and eNB-type RAN reference entities.

The eNB control apparatus 70 may be configured to process signals from the radio frequency interface circuitry 703, control the radio frequency interface circuitry 703 to generate suitable RF signals to communicate information to the UEs 6 and UE-type RAN reference entities via the wireless communications link, and also to exchange information with other eNBs 7, eNB-type RAN reference entities 8 and the V2X server apparatus 3 via the interface 709. The control apparatus 70 may comprise processing apparatus 702 and memory 704.

Computer-readable code 704-2A may be stored on the memory 704, which when executed by the processing apparatus 702, causes the control apparatus 70 to perform any of the operations assigned to the eNBs 7 and described with reference to any of FIGS. 1 to 5.

Figure 8:
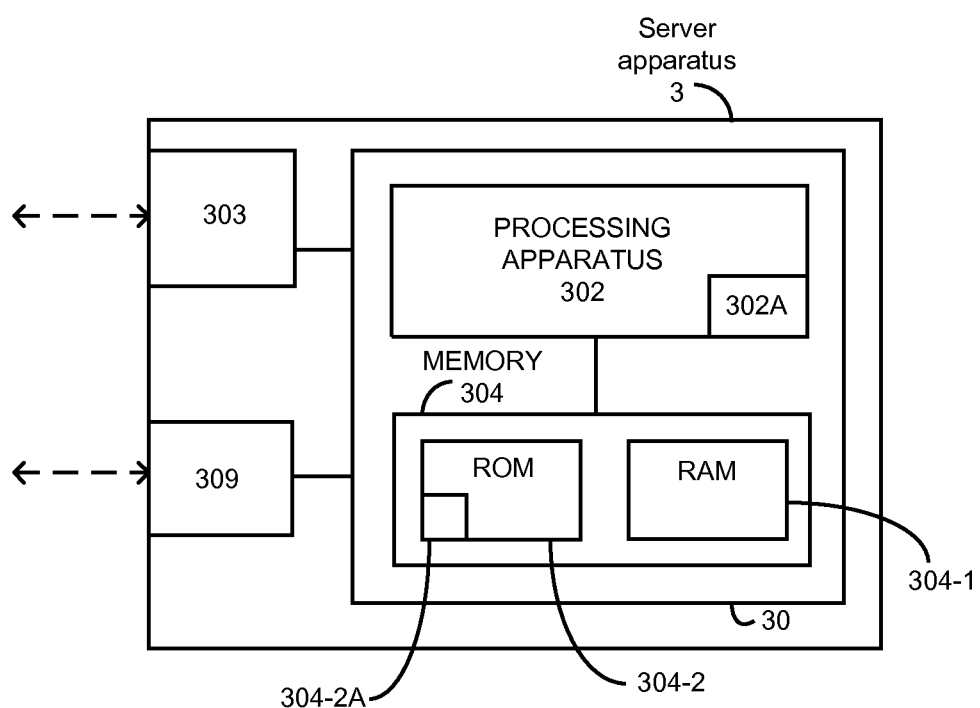
FIG. 8 is a schematic illustration of an example configuration of a server apparatus which may be configured to perform various operations described with reference to FIGS. 1 to 5.

FIG. 8 is a schematic illustration of an example configuration of the server apparatus 3 depicted in FIG. 1. The server apparatus 3 may be configured for bi-directional communication with one or more of the eNBs 7. As discussed above, the server apparatus 3 may be located remotely to the eNBs 7 of the network 1 or may be co-located with one of the eNBs 7, which may be referred to as a "master eNB". In examples in which the server apparatus 3 is co-located with an eNB 7, the server apparatus may be responsible for performance of at least some of the operations described with reference to the eNB 7 in FIGS. 3 and 5. In such examples, these operations may run as a background task.

In examples in which the server apparatus 3 is co-located with one of the eNBs 7, the server apparatus 3 may be responsible for managing a number of eNBs 7 within a particular area, with other server apparatuses being provided for managing eNBs 7 in different areas. In such examples, there may additionally be a remote server apparatus 3 which may manage behaviour of all of the server apparatuses 3 which are co-located with respective eNBs 7.

The server apparatus 3 comprises control apparatus 30 which is configured to cause performance of various operations described above with reference to the server (and also, in some examples, with reference to eNB 7). The control apparatus may be further configured to control operation of other components of the server apparatus 3, which may include at least one interface 303, 309 for communicating with one or more of the eNBs 7, and in some instances also a wider area network such as the internet. The at least one interface may be of any suitable wired or wireless type 303, 309.

The control apparatus 30 may comprise processing apparatus 302 and memory 304. Computer-readable code 304-2A may be stored on the memory 304 which, when executed by the processing apparatus 302, causes the control apparatus 70 to perform any of the operations assigned to the server apparatus (and in some examples also the eNBs 7) and described with reference to any of FIGS. 1 to 5.

In some examples, the server may be a V2X server. The server apparatus (whether a V2X server or not) may be operated by a network provider which deploys/provides/operates the eNBs and/or the RAN reference entities. In such examples, the server apparatus may be an operation and maintenance (O&M) server for the network provider operating either or both the eNBs and the RAN reference entities. In such examples, location information of RAN reference entities may be provided to the eNBs by the O&M server of a network provider for instance as part of eNB configuration parameters. In examples in which the RAN reference entities are provided/deployed/owned by different operators than the eNBs, the location information may be provided by an O&M server associated with the operator of the RAN reference entities and not the eNB 7.

As should of course be appreciated, the apparatuses 6, 7, 3 shown in each of FIGS. 6, 7 and 8 described above may comprise further elements which are not directly involved with processes and operations in respect which this application is focussed.

As will be appreciated, the configurations of the RAN reference entities 8 may depend on the type of the RAN reference entity. For instance, the UE-type RAN reference entities 8 may have a configuration as described with reference to FIG. 6. Similarly, eNB-type RAN reference entities 8 may be configured as described with reference to FIG. 7.

Some further details of components and features of the above-described apparatus/entities/apparatuses 3, 6, 7, 8, 30, 60, 70 and alternatives for them will now be described.

The control apparatuses 30, 60, 70 may comprise processing apparatus 302, 601, 702 communicatively coupled with memory 304, 602, 704. The memory 304, 602, 704 has computer readable instructions 304-2A, 602-2A, 704-2A stored thereon, which when executed by the processing apparatus 302, 601, 702 causes the control apparatus 30, 60, 70 to cause performance of various ones of the operations described with reference to FIGS. 1 to 8. The control apparatus 30, 60, 70 may in some instance be referred to, in general terms, as "apparatus".

The processing apparatus 302, 601, 702 may be of any suitable composition and may include one or more processors 302A, 601A, 702A of any suitable type or suitable combination of types. For example, the processing apparatus 302, 601, 702 may be a programmable processor that interprets computer program instructions 304-2A, 602-2A, 704-2A and processes data. The processing apparatus 302, 601, 702 may include plural programmable processors. Alternatively, the processing apparatus 302, 601, 702 may be, for example, programmable hardware with embedded firmware. The processing apparatus 302, 601, 702 may be termed processing means. The processing apparatus 302, 601, 702 may alternatively or additionally include one or more Application Specific Integrated Circuits (ASICs). In some instances, processing apparatus 302, 601, 702 may be referred to as computing apparatus.

The processing apparatus 302, 601, 702 is coupled to the memory (which may be referred to as one or more storage devices) 304, 602, 704 and is operable to read/write data to/from the memory 304, 602, 704. The memory 304, 602, 704 may comprise a single memory unit or a plurality of memory units, upon which the computer readable instructions (or code) 304-2A, 602-2A, 704-2A is stored. For example, the memory 304, 602, 704 may comprise both volatile memory 304-1, 602-1, 704-1 and non-volatile memory 304-2, 602-2, 704-2. For example, the computer readable instructions/program code 304-2A, 602-2A, 704-2A may be stored in the non-volatile memory 304-2, 602-2, 704-2 and may be executed by the processing apparatus 302, 601, 702 using the volatile memory 304-1, 602-1, 704-1 for temporary storage of data or data and instructions. Examples of volatile memory include RAM, DRAM, and SDRAM etc. Examples of non-volatile memory include ROM, PROM, EEPROM, flash memory, optical storage, magnetic storage, etc. The memories in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

Figure 9:
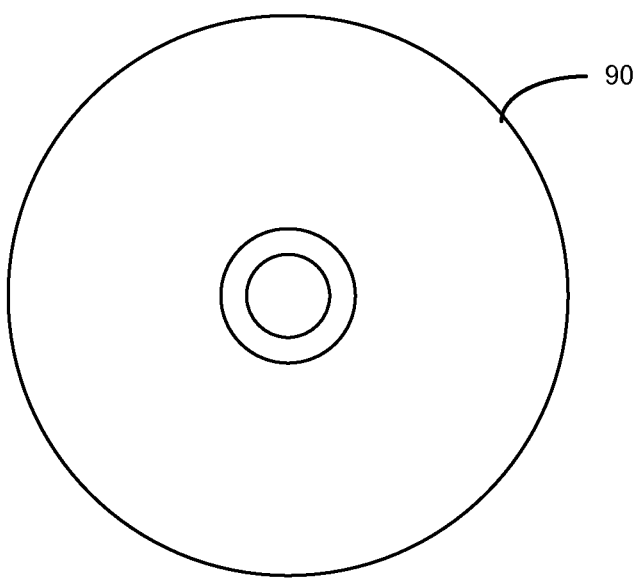
FIG. 9 is an illustration of a computer-readable medium upon which computer readable code may be stored.

The computer readable instructions/program code 304-2A, 602-2A, 704-2A may be pre-programmed into the control apparatus 30, 60, 70. Alternatively, the computer readable instructions 304-2A, 602-2A, 704-2A may arrive at the control apparatus via an electromagnetic carrier signal or may be copied from a physical entity 90 such as a computer program product, a memory device or a record medium such as a CD-ROM or DVD an example of which is illustrated in FIG. 9. The computer readable instructions 304-2A, 602-2A, 704-2A may provide the logic and routines that enables the entities devices/apparatuses 3, 6, 7, 8 to perform the functionality described above.

The combination of computer-readable instructions stored on memory (of any of the types described above) may be referred to as a computer program product.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing apparatus" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined. Similarly, it will also be appreciated that flow diagrams of FIGS. 2 to 5 are examples only and that various operations depicted therein may be omitted, reordered and or combined.

Although the method and apparatus have been described in connection with an E-UTRA network, it will be appreciated that they are not limited to such networks and are applicable to radio networks of various different types.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:
1. An apparatus, comprising:
at least one processor; and
at least one memory including computer program code;
the at least one memory and the computer program code configured to, with the at least one processor, cause the apparatus at least to:
receive, by a user equipment from an eNodeB, configuration information indicating that a mode of reporting of location information by the user equipment should be adapted in response to the user equipment detecting a reference network entity in the vicinity of the user equipment, wherein the configuration information includes location reporting mode priority information indicating relative priorities of at least two modes of reporting of location information;
subsequently detect, by the user equipment, a reference radio access network entity in the vicinity of the user equipment; and
adapt, by the user equipment in response to detecting the reference radio access network entity within the vicinity of the user equipment, a mode of reporting of location information identifying or enabling identification of a location of the user equipment.

2. The apparatus of claim 1, wherein the apparatus is further caused to detect the reference radio access network entity within the vicinity based on receipt of a message from the reference radio access network entity.

3. The apparatus of claim 2, wherein the apparatus is further caused to adapt the mode of the reporting of location information based on assistance information in the message which indicates that a location of the reference radio access network entity is known to an eNodeB or an associated server apparatus.

4. The apparatus of claim 3, wherein the assistance information includes an identifier associated with the reference radio access network entity.

5. The apparatus of claim 1, wherein adapting the mode of the reporting of location information includes suspending reporting of geo-location information and causing transmission of a message including an identifier associated with the reference radio access network entity.

6. The apparatus of claim 1, wherein the apparatus is further caused to receive from the eNodeB, prior to detecting the reference radio access network entity, information including an identifier associated with the reference radio access network entity.

7. The apparatus of claim 2, wherein the apparatus is further caused to adapt the mode of the reporting of location information based on assistance information in the message which indicates a capability of the reference radio access network entity to report location information on behalf of the user equipment.

8. The apparatus of claim 7, wherein adapting the mode of the reporting of location information includes suspending the reporting of location information during timeslots allocated for reporting location information.

9. The apparatus of claim 1, wherein the configuration information indicates at least two modes of reporting of location information, at least one of the modes being associated with the detection of the reference radio access network entity in the vicinity of the user equipment.

10. The apparatus of claim 1, wherein the apparatus is further caused, in response to determining that the reference radio access network entity is no longer within the vicinity of the user equipment, to resume an original mode of reporting of location information identifying the location of the user equipment.

11. The apparatus of claim 1, wherein the apparatus is further caused to:
determine if the reference radio access network entity is in the vicinity of the user equipment;
adapt, in response to detecting the reference radio access network entity within the vicinity of the user equipment, the mode of reporting of location information by suspending reporting of geo-location information identifying a location of the user equipment; and
cause, in response to determining that the reference radio access network entity is not within the vicinity of the user equipment, performance of the reporting of geo-location information identifying the location of the user equipment.

12. The apparatus claim 1, wherein the apparatus comprises a user equipment.

13. An apparatus, comprising:
at least one processor; and
at least one memory including computer program code;

the at least one memory and the computer program code configured to, with the at least one processor, cause the apparatus at least to:

cause transmission, by an eNodeB to user equipment being served by the eNodeB, of configuration information for causing the user equipment to adapt a mode of reporting of geo-location information identifying a location of the user equipment in response to detecting a reference radio access network entity in the vicinity of the user equipment, wherein the configuration information includes location reporting mode priority information indicating relative priorities of at least two location information reporting modes for the user equipment;

receive, at the eNodeB, information from the user equipment identifying a reference radio access network access entity in the vicinity of the user equipment or information from the reference radio access network entity identifying the user equipment; and determine, at the eNodeB, a location of the user equipment based on the received information and information identifying a location of the reference radio access network entity or forwarding, by the eNodeB, the received information to enable determination of the location of the user equipment based on the forwarded information and information identifying the location of the reference radio access network entity.

14. An apparatus, comprising:
at least one processor; and
at least one memory including computer program code;
the at least one memory and the computer program code configured to, with the at least one processor, cause the apparatus at least to:
receive, by a user equipment location reporting configuration information, wherein the location reporting configuration information identifies at least two location information reporting modes for the user equipment, at least one reporting mode being associated with detection of a reference radio access network entity.

15. An apparatus, comprising:
at least one processor; and
at least one memory including computer program code;
the at least one memory and the computer program code configured to, with the at least one processor, cause the apparatus at least to:
transmit location reporting configuration information to a user equipment, wherein the location reporting configuration information identifies at least two location information reporting modes for the user equipment, at least one reporting mode being associated with detection of a reference radio access network entity by the user equipment.

* * * * *